Figure 1:
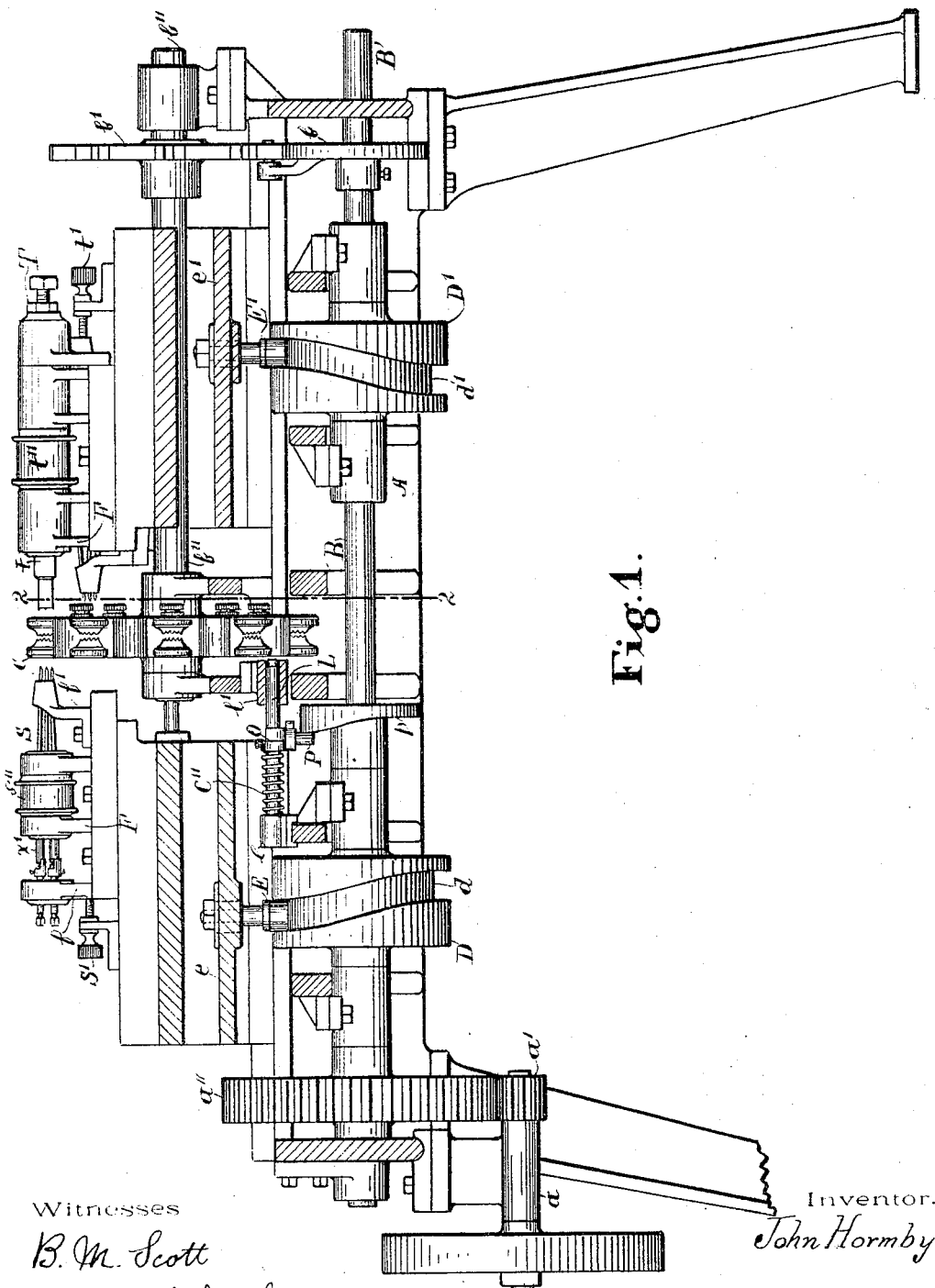

No. 611,811. Patented Oct. 4, 1898.
J. HORMBY.
BUTTON MAKING MACHINE.
(Application filed Oct. 6, 1897.)
(No Model.) 4 Sheets—Sheet 1.

Witnesses
B. M. Scott
Chester H. Higgins

Inventor.
John Hormby.
By William R. Baird
Attorney.

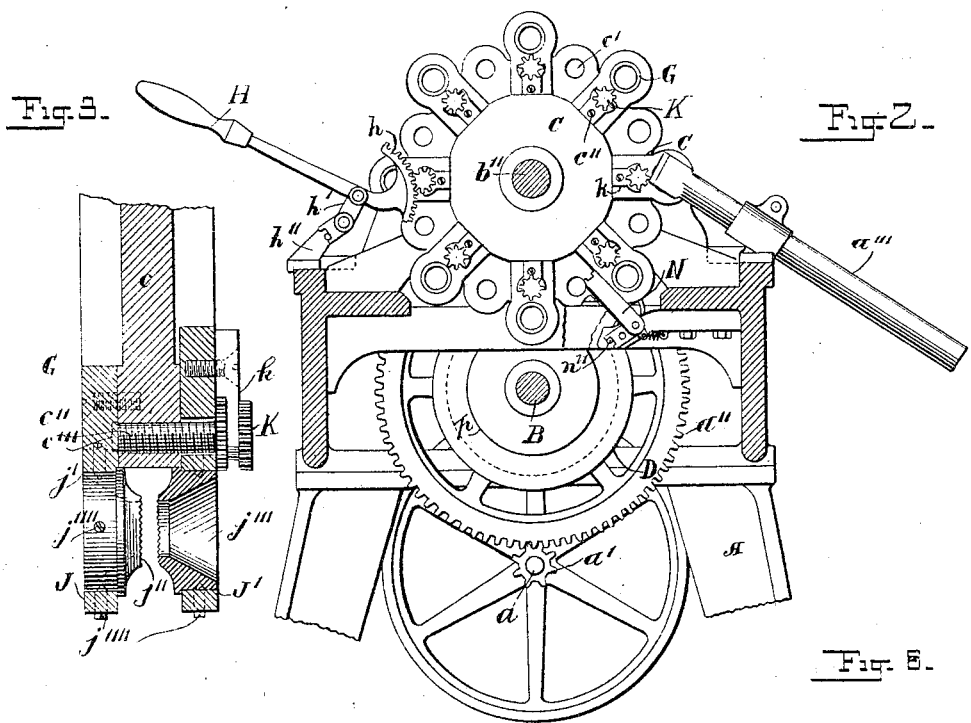
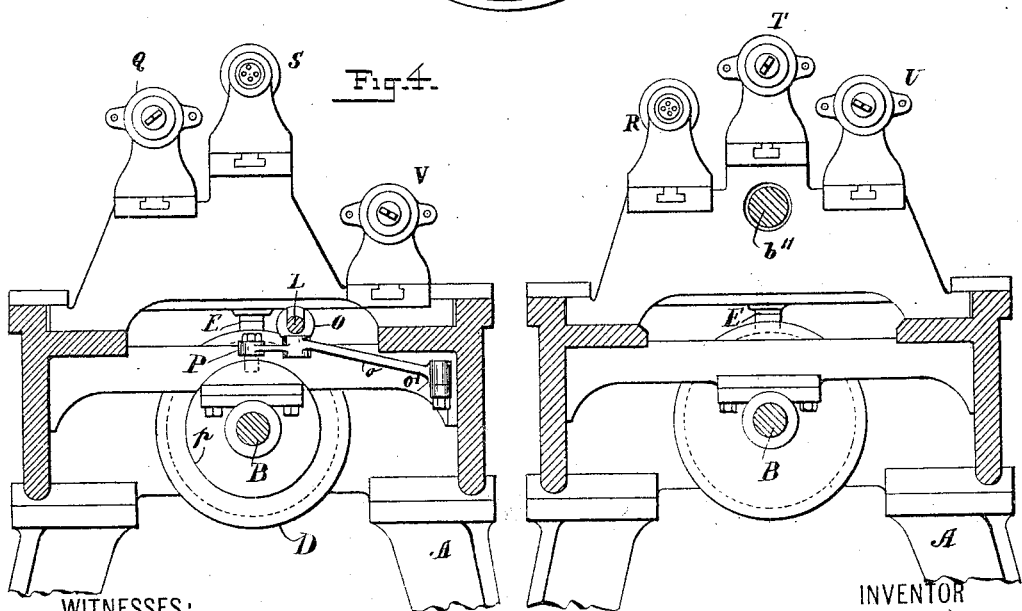

No. 611,811. Patented Oct. 4, 1898.
J. HORMBY.
BUTTON MAKING MACHINE.
(Application filed Oct. 6, 1897.)
(No Model.) 4 Sheets—Sheet 3.
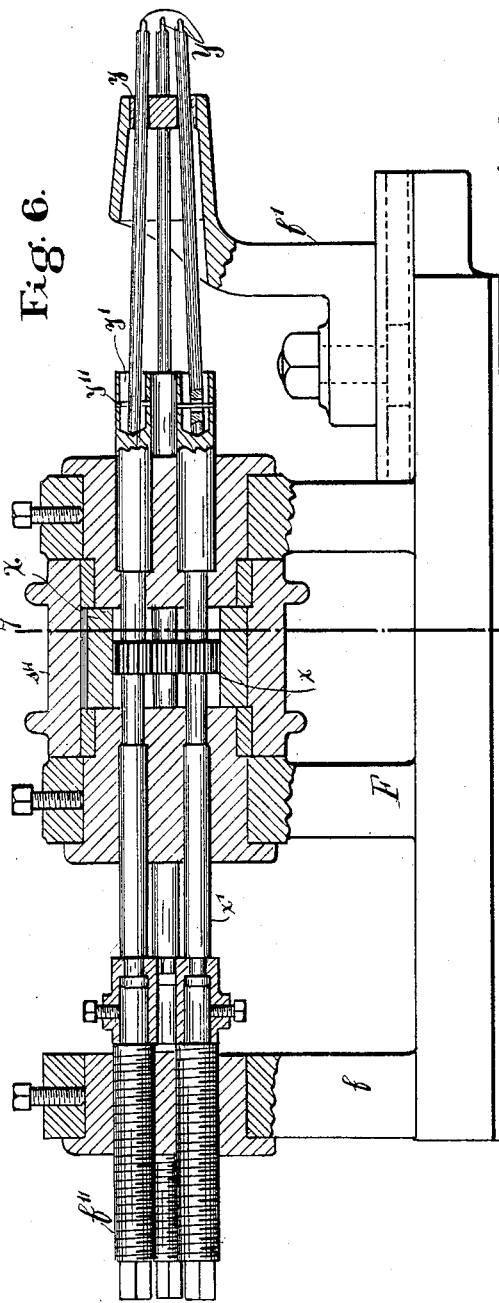
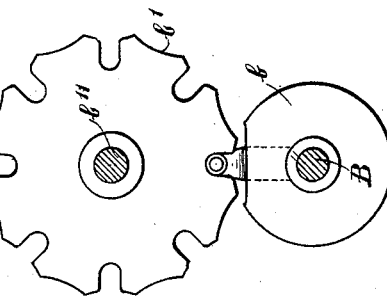
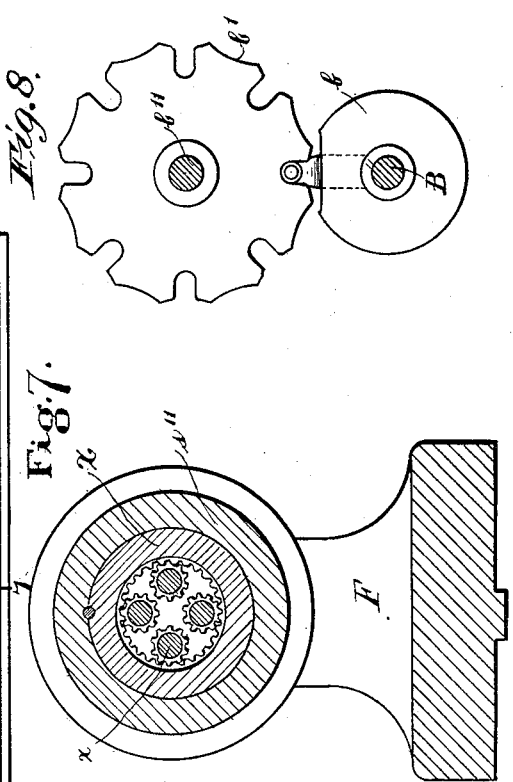
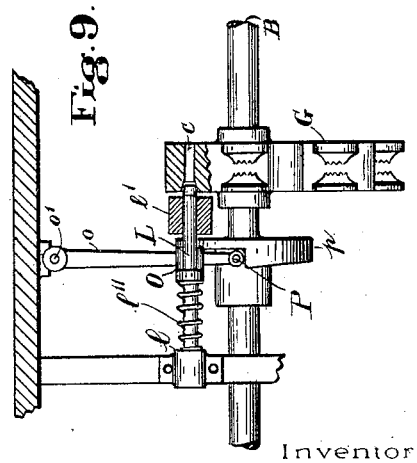
Witnesses
B. M. Scott
Chester H. Higgins
Inventor.
John Hormby.
By William R. Baird
Attorney.

No. 611,811. Patented Oct. 4, 1898.
J. HORMBY.
BUTTON MAKING MACHINE.
(Application filed Oct. 6, 1897.)
(No Model.) 4 Sheets—Sheet 4.

WITNESSES:
B. M. Scott
Chester H. Higgins

INVENTOR
John Hormby.
BY William R. Baird
ATTORNEY

UNITED STATES PATENT OFFICE.

JOHN HORMBY, OF NEW YORK, N. Y.

BUTTON-MAKING MACHINE.

SPECIFICATION forming part of Letters Patent No. 611,811, dated October 4, 1898.

Application filed October 6, 1897. Serial No. 654,225. (No model.)

*To all whom it may concern:*

Be it known that I, JOHN HORMBY, of New York, (Brooklyn,) in the county of Kings and State of New York, have invented certain new and useful Improvements in the Manufacture of Buttons; and I do hereby declare the following to be a full, clear, and exact description of the invention, such as will enable others skilled in the art to which it appertains to make and use the same.

My invention has for its object the manufacture of buttons from slabs of irregular outline roughly formed by cutting off slices from the so-called "ivory-nut," (*Phytelephas ma-* *crocarpa*,) by subjecting the slabs continually but intermittently and successively to the action of sundry facing and backing tools until the button is completed, and simultaneously treating a series of slabs in the same mechanism. The kind of button which I design to produce is one having a rounded projecting edge, a flat face, and rounded back, with four buttonholes drilled through and countersunk from each side. It has long been common to attempt to manufacture buttons from this vegetable ivory by first making blanks of uniform size and shape, feeding the same to a chuck or carrier, and bringing them successively to the action of sundry tools. The operation of making blanks of uniform size is expensive and relatively lengthy, and by means of my invention the finished button can be produced with about the same expense and in about the same time as has heretofore been required to produce the blanks to be operated upon by the mechanism heretofore employed. In the methods of manufacture now employed and known to me attempts have been made also to restrict the number of operations to which the raw material is subjected. This necessitates the use of exceedingly sharp tools in finishing a button, but which speedily lose their edge when used for both the fine and coarse cutting operations. This vegetable ivory has a peculiar structure. It is hard and brittle, but not uniformly so. It is therefore apt to chip when first subjected to the action of a rapidly-revolving tool, and it needs to be firmly held while being operated upon.

By means of my invention, which I have reduced to practice and embodied in the mechanism about to be described, I save the time and labor involved in making uniform-sized blanks, the expense of constantly sharpening the tools employed, and I overcome the disadvantages inherent in the nature of the raw material.

I carry out my invention as follows: I first slice the ivory-nuts into slabs slightly thicker than the button to be made therefrom. This may be accomplished by a circular saw or any other suitable means. I thus secure a quantity of slabs of the raw material of about the same thickness and with approximately parallel faces, but of irregular outline, as the nuts are oval and ovoid in shape. These slabs I then place in what I call a "grip-carrier." This is a device for firmly holding the slab by gripping it tightly from each side by teeth which surround the surface external to that from which the button is to be cut, leaving an annular space, within which the operations of the tools take place. This grip-carrier is provided with means for holding the blank firmly even if its faces are not strictly parallel. Each slab firmly held by the grip-carrier is then first brought between a pair of cutters made of hardened steel, rotating at a high rate of speed in opposite directions and cutting simultaneously against the face and back of the slab, removing the bulk of the extraneous material, and roughly shaping the slap to the design of the button. This operation being concluded, the slab is then carried between a second pair of tools which simultaneously act upon it, one, a fine finishing-cutter, completing the shaping of the face of the button, the other drilling the holes from the back of the button not quite to its center, and, if desired, countersinking the holes at the same time. The slab is then carried in front of a tool which drills and countersinks the holes in the face of the button, meeting and joining the holes cut from the rear. The slab is then carried in front of an edging-tool, which works from the back and which cuts the finished button away from the slab and permits it to drop into a suitable receptacle provided to receive it. The grip-carrier still retains hold of the external piece of the slab from which the finished button has been cut, and finally this is made to pass in front of or by a suitable trip which loosens the grip and permits the piece to drop into a waste heap.

Figure 10:
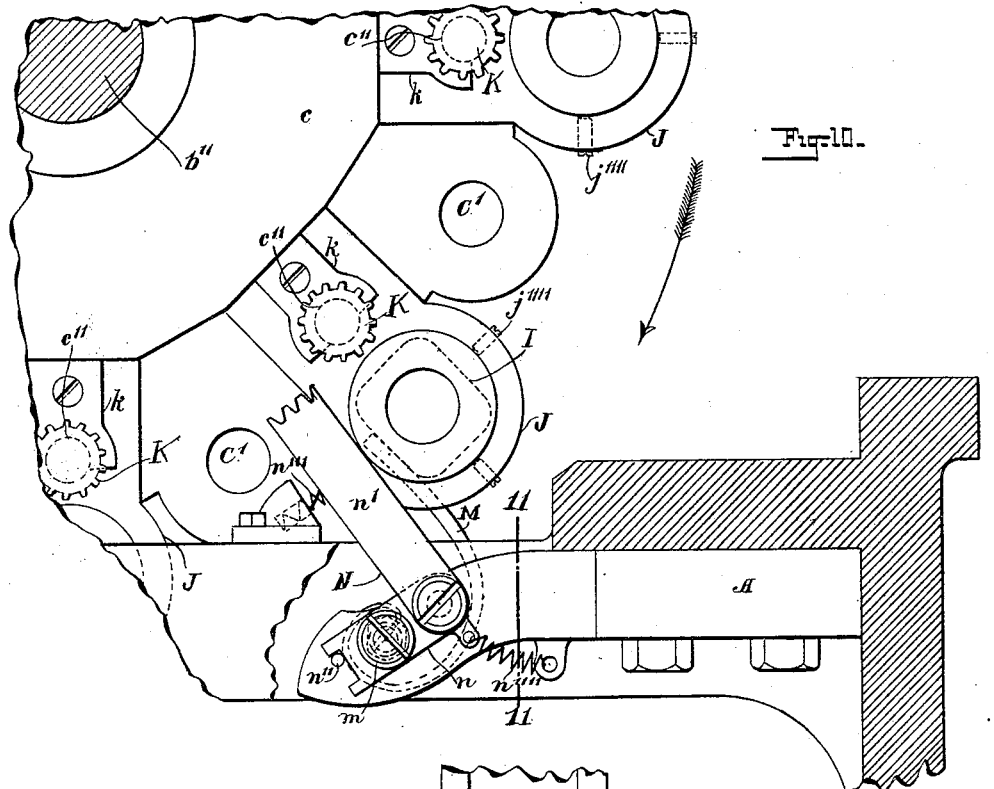
Figure 11:
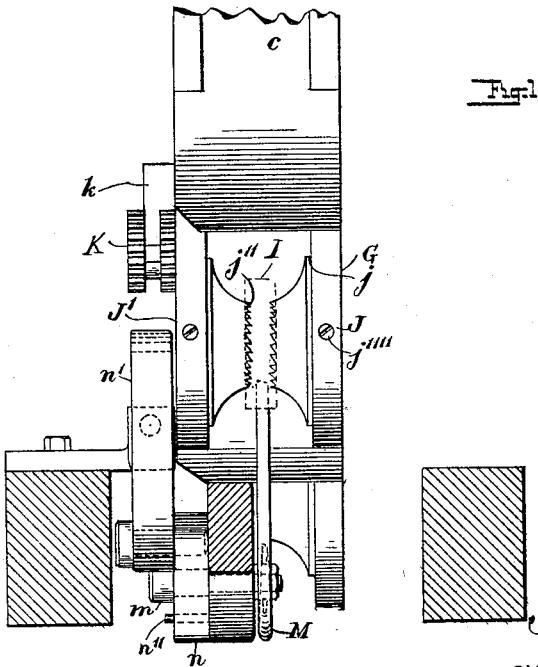

Figure 1 is a front elevation and partial section of the mechanism embodying my invention. Fig. 2 is a section of the same, taken on the plane of the line 2 2 in Fig. 1, and a partial elevation looking toward the left as the observer stands in front of the machine. Fig. 3 is a detail of one of the jaws and locking mechanism of the grip-carrier. Fig. 4 is an elevation of the backing-tools. Fig. 5 is a similar view of the facing-tools. Fig. 6 is a detail in elevation and partial section of the drilling-tools with their actuating and adjusting mechanism. Fig. 7 is a central vertical section of the same on the plane of the line 7 7 in Fig. 6. Fig. 8 is a plan detail of the Geneva gear for operating the multiple grip-carrier shaft. Fig. 9 is a plan detail view from above of the mechanism for locking the multiple grip-carrier in place while the tools are operating upon the button-slab. Fig. 10 is a plan detail and partial section of the device which unlocks the jaws of the grip-carrier and permits the release of the waste piece after the button is cut from the slab. Fig. 11 is a rear elevation of the same.

In the drawings, in which the same reference-letters indicate the same parts in all of the views, A is a bed-plate or frame upon which the mechanism to be described is supported. $a$ is the driving-shaft, suitably actuated from an external source of power and carrying a pinion $a'$, which meshes into a gear $a''$, which is mounted upon a cam-shaft B, thereby causing it to rotate.

Mounted upon the cam-shaft B is a dog $b$, which meshes into a Geneva gear $b'$, which is in turn mounted upon a shaft $b''$, to which it imparts an intermittent rotary motion, and which carries the multiple grip-carrier C in suitable bearings.

On the cam-shaft B are mounted two cam-wheels D and D', provided with encircling grooves or camways $d$ and $d'$, engaging with cam-rolls E and E', adjustably secured to the beds of two carriages $e$ and $e'$, suitably mounted on the main frame A, and to which carriages there is thereby imparted an intermittent reciprocating motion. These carry the spindle-bearings upon which the operating-tools are mounted. Each of these bearings is adjustably secured in place in a manner well known in the art and which needs no detailed description.

The multiple grip-carrier C, mounted upon the shaft $b''$, consists of a central disk $c$, provided at regular intervals near its periphery with apertures $c'$, suitably bushed and adapted to receive the locking-pin L, hereinafter to be described. It is also provided at regular intervals, but intermediate the locking-pin apertures $c'$, with an identical number of grips G, in which are secured the vegetable-ivory slabs while being operated upon. Each grip-carrier consists of two jaws J and J', each mounted upon the central disk $c$ and provided with means for opening and closing them, presently to be described. The operating part of each jaw consists of an annular piece $j$, adapted to be adjustably secured to the plate $j'$ of the jaw and provided at its inner edge with teeth $j''$, projecting toward the similar toothed surface of the opposite jaw. The annular opening $j'''$, to allow access of the tools in operating upon the ivory slab, I prefer to make conical and tapering outward from its toothed inner edge in order to permit of the easier escape of the shavings as they are formed. Each annular piece is mounted in its jaw-plate by means of four pointed set-screws $j''''$, whereby a slight oscillating motion is permitted in two directions, so as to firmly hold in place the ivory slab, even if its sides are not quite parallel. Any two opposite screws being loosened by means of a screw-driver or similar tool a slight oscillation is thus permitted upon the other two screws as centers. Similarly when the latter screws are loosened and the other pair tightened an oscillation is permitted in the other direction. By this means a slab of the material is held firmly in place, even if its sides are not quite parallel. This does not often occur, because the operatives who saw the nuts become very expert; but I have provided this means of adjustment should occasion arise for its use.

The means which I provide for opening and closing the jaws is as follows: The left-hand jaw J of each grip-carrier is detachably but rigidly secured to the central disk $c$ by any suitable means—for instance, the screws $c''$. A threaded aperture $c'''$ is cut through the central disk and into the left-hand jaw. This aperture is continued through the right-hand jaw J', but is not threaded. Within this aperture is placed a screw carrying on its outer extremity a pinion K, which is grooved to admit of the passage of a fork $k$, secured to the right-hand jaw-plate. In order to close the jaws against the slab placed between them, the pinion K is caused to rotate. The means I employ for this purpose is a segmental gear $h$, provided with a handle H, pivoted on a link $h'$, pivotally mounted upon a bracket $h''$, projecting upward from the frame of the machine. The operator standing in front of the machine places the ivory slab between the open jaws of that grip-carrier of the multiple carrier opposite and nearest to him and presses the handle H forward and downward. This causes the segmental gear $h$ to mesh with the pinion K and to rotate. This rotation turns the screw $c''$ and brings the right jaw J' nearer to the left-hand jaw J and tightly holds the slab in place. Similarly the jaws are opened by reversing this operation.

It will be observed that the amount of pressure exerted on the slabs by the jaws is entirely under the control of the operator and that such pressure is thereafter constant and not varied so long as the slab is in the grip. This construction prevents any movement of the slab during the operation of the tools and insures accuracy and uniformity of finish in the manufactured button.

The means which I employ automatically to open the jaws of the grip-carrier G after the button has been delivered are illustrated in Figs. 10 and 11. In these figures K is the actuating-pinion of the jaws. The waste annulus of the ivory slab is shown in dotted outline between the jaws of the grip-carrier. As the grip-carrier continues to rotate after the button has been delivered this waste annulus I strikes the free end of a coiled spring M, the other end of which is secured to a stud $m$, which is rigidly fastened to or made integral with the lower member $n$ of a jointed link N, of which the upper member $n'$ is provided at its outer extremity with a segmental gear. The spring M being thus compressed throws the upper member $n'$ of the jointed link N upward, and as the rotation of the grip-carrier continues the pinion K comes into mesh with this segmental gear, is caused to rotate, opens the jaw, and releases the waste annulus I. The oscillation of the link N is limited by a stop-pin $n''$, and the shock of its downward motion is diminished by a cushion-spring $n'''$, suitably mounted on the frame. After this jointed link N has performed its function it is retracted into place by the action of a spring $n''''$, secured to it and to the frame. When, however, there is no waste annulus in the grip, the spring M is not brought into action, the link N is not moved, and the jaws of the grip are not affected.

While in the operation of the machine the action of the Geneva gear $b'$ causes the multiple grip-carrier C to remain at rest while the facing and backing tools are operating upon the ivory slabs carried by it, yet I have found it advantageous in practice that the multiple grip-carrier and its load should be more rigidly and securely held in place while these operations are going on. To that end I provide what I term a "locking-pin," whereby great efficiency in the desired direction is secured.

The locking-pin L is a straight rod tapered at its outer extremity and loosely supported in bearings $l$ and $l'$, mounted on the frame underneath the reciprocating carriages. At one point in its length it is embraced from beneath by the forks of a stud O, which is in turn supported by a bracket $o$, pivoted in the frame of the machine at $o'$. At the opposite end of the bracket and dependent therefrom is secured a cam-roll P, to which is imparted a reciprocating motion by means of the cam $p$, mounted upon the cam-shaft B. Between the stud O and the rear bearing $l$ and encircling the locking-pin is a coiled spring $l''$, adapted to push it toward the grip-carrier.

The motion and position of the cam $p$ are so timed that when the multiple grip-carrier C in its rotation is brought to rest the locking-pin L is pushed forward into that aperture $c$ then opposite to such pin. The cam-shaft B, however, continues to revolve and moves the cam-roll P, so that just before the rotation of the multiple grip-carrier is about to recommence the locking-pin L is moved rearwardly from the aperture in which it has been engaged.

The tools which I use to perform the sundry operations on the ivory slab I have arranged in sets of three—viz., Q, S, and V on one side of the multiple grip-carrier and R, T, and U on the other side thereof. The right-hand set of tools—viz., R, T, and U—are mounted upon the reciprocating carriage $e'$ and the left-hand set upon the similar carriage $e$. Each tool is mounted on a spindle—for instance, $t$—which is journaled in bearings—for instance, F—which are detachably but firmly secured to the upper surface of the carriage in the manner well understood by machinists. Each tool is also supplied with means, as an adjusting-screw—for instance, $t'$ or $s'$—for securing a fine additional adjustment thereof. All of the bearings are interchangeable on the carriages. Each spindle is actuated from a source of external power. (Not shown.) In the particular mechanism illustrated a pulley, as $s''$ or $t''$, is rotated by a belt. Four of the tools—viz., Q, V, T, and U—are cutting-tools, while two of them—viz., S and R—are drilling and countersinking tools. Tools Q and V are what I term "shaping-tools." Their centers are in the same line, and they are designed simultaneously to operate upon the same ivory slab from each side thereof and approximately cut it to shape by removing therefrom any portion of the outer bark of the nut and the greater part of the waste material on each side of the button to be made. They revolve in opposite directions, thus lessening the liability to chatter, and each tool serves as a rest or support against the lateral pressure exerted by the forward movement of the other member of the pair. The lateral strains against the slab are thus much lessened or completely neutralized. Tools S and T are also arranged with their centers in the same line. T is a fine cutting-tool designed to finish the face of the button to be made, and S is a drilling-tool designed to drill the necessary holes in the slab, about half-way through it, so as not to come into contact with the finishing-tool. It is of such shape that it countersinks the holes at the same time. Tool R is also a drilling-tool designed to operate upon the face of the slab and to complete the holes partly made by tool S from the opposite side thereof. Tool V is a finishing and edging tool which operates upon the back of the slab and finally cuts out the finished button, permitting it to drop into a receptacle $a'''$, provided for the purpose.

The construction of the drilling-tools S and R, I believe to be novel and original with myself and to merit a detailed description. The construction of these tools is best exhibited in Figs. 6 and 7. In these figures F is the spindle-bearing, and $s''$ is the pulley. Within the pulley is secured an internal gear X, which meshes with four pinions $x$, made integral with the spindles $x'$, which are journaled in the bearing. Upon this bearing are mounted two brackets $f$ and $f'$. The rear bracket $f$ supports a series of independent adjusting-screws $f''$, one for each spindle, by means of which the longitudinal position of the spindles may be accurately and independently fixed. At the forward end of each spindle is mounted the drills—for instance, Y—each one of which passes through a disk $y$, mounted on the bracket $f'$, and which are provided with tapered apertures for that purpose. The rear end of each drill is held within a cup-shaped pocket $y'$ formed in the end of the spindle by means of a cross-wire $y''$ or other suitable means, forming, in effect, on said pivot a universal joint. The four drills are mounted so that their axes are not parallel with the axes of their respective spindles and so that they converge toward their points of operation, and thereby drill the buttonholes closer together than could be accomplished when arranged horizontally.

By changing the disk $y$ or by using disks having apertures of different arrangement with the same spindles the drills may be caused to converge or diverge in any desired manner. I usually make the drills of such shape that they countersink the holes as well as drill them.

In carrying out my invention I operate upon the raw material—viz., the slab of ivory-nut—as follows: The operator stands in front of the machine, looking at it as it is seen in Fig. 1, and on its left as it is shown in Fig. 2. He then grasps the handle H and pushing it upward and forward thus opens the jaws of the grip-carrier nearest to him. With his left hand he then places the ivory slab within the jaws of the carrier and moving the handle downward with his right hand locks the slab in place, and then pulling the handle H toward him takes it out of mesh with the grip-pinion K. In the meantime the grip-carrier has been at rest through the operation of the Geneva gear and the locking-pin L. The locking-pin being released and the multiple locking-pin being released and the multiple grip-carrier then starting to rotate carries the grip-carrier, in which the slab has been placed, until it is opposite and between the two shaping-tools Q and R. The motions of the multiple carrier and of the reciprocating carriage on which the tools are placed are such that as the grip-carrier comes to rest between the pair of tools and is locked in place by the locking-pin they are brought forward to perform the first step of the operation of manufacturing the buttons. The cutters on these tools revolve in opposite directions, which equalizes the strain on the material to be cut. As soon as this cutting operation is completed and the carriage starts back from the multiple grip-carrier the latter again begins to rotate and carries the slab between the next pair of tools—viz., the drills operating on its back and the finishing-tool operating on its face. In the meantime and while the shaping-tools were performing their work the operator has placed a second slab in the grip then nearest to him, and when the first slab is brought between the second pair of tools the second slab is brought between the first pair of tools, and while these two slabs are being operated upon the operator places a third slab in the next grip. The multiple grip-carrier continuing its rotation brings the first slab in front of the drilling-tool R, which drills and countersinks the holes from the face of the slab. While this is being done the second slab is being finished from the face and drilled from the back and the third slab is being shaped on both sides and a fourth slab is being placed in the next grip. The multiple carrier then continues its rotation and brings the first slab in front of the back-finishing and edging tool V, when at the conclusion of the operation the button is delivered to its proper receptacle $a'''$. In the meantime the second slab has been drilled from the face, the third slab has been finished from the face and drilled from the back, the fourth slab has been shaped, and a fifth slab has been put into the next grip. There is then left in the first grip the waste annulus surrounding the hole left by the removal of the button, and as the multiple carrier continues its rotation the first grip is automatically opened and this waste discharged, as has been above described. While this last operation is taking place the second slab is being finished from the back and its button cut out, the third slab is being drilled from the face, the fourth slab is being finished from the face and drilled from the back, the fifth slab is being shaped, and a sixth slab has been put into the next grip, so that in the future operation of the machine one button is being delivered for each slab which is being inserted, and a button is consequently being made each time the multiple grip-carrier comes to rest, while five slabs are being simultaneously acted upon by the several tools employed.

The shavings from the cutting-tools, it will be observed, drop in one place, the finished button is delivered in another, and the waste annulus in a third, thus effecting a desirable separation between the large pieces of the waste and the shavings and saving the expense of sieving the waste.

By means of the mechanism above described I secure certain important results, viz: Operating from both sides of the slab simultaneously I avoid the dangers and difficulties which arise from presenting the work to a rapidly-revolving tool without any means of lessening the shock. I also neutralize the strain upon the material by rotating the tools in opposite directions, and I effect a great saving of time in performing these operations simultaneously. I am also able to countersink the buttonholes from both sides. By gripping the slab from the sides I avoid the necessity for fashioning blanks of uniform size and shape preliminary to the button-making operations, and I save not only the time and labor incident to such preparation, but I make the completed button within the time which such preliminary operation would alone take.

By placing the tools on each side of the carrier and mounting them on the same mechanism and actuating them from the same shaft I secure a uniformity of action and freedom from vibration heretofore unattainable.

I have described my invention with particular reference to the manufacture of buttons from vegetable ivory. It is obvious, however, that it is equally applicable to the same manufacture from other materials, such as horn, capable of similar treatment. Modifications in detail may likewise be made in my invention without departing from the essential principles upon which it is based. The size and shape of the tools may be varied, the successive positions in the series of operations may be varied within limits, and other changes in the form, proportion, or precise manner of operation are quite within the skill of the constructive engineer without departing from the practice of the invention itself.

Having described my invention, what I claim as new is—

1. In a machine for manufacturing buttons from slabs of vegetable ivory, or the like, having an irregular outline but approximately parallel faces, a grip-carrier consisting of a pair of jaws for laterally holding the slabs during said manufacture, each jaw being suitably apertured to give access to the operating-tools, one of said jaws being fixed to the carrier, and the other movable, means for rigidly locking the movable jaw against the slab, means for automatically opening said jaws, during the intermittent movement of the carrier, and means for intermittently moving said carrier.

2. In a machine for manufacturing buttons from slabs having approximately parallel faces, a multiple grip-carrier consisting of a disk upon which is mounted a plurality of grip-carriers each consisting of a pair of jaws, one fixed in relation to the disk and the other movable in relation thereto in a direction at right angles to the faces of the slabs, and means for automatically opening and for rigidly but not automatically closing said jaws, and means for intermittently rotating the disk in a plane at right angles to the axes of the operating-tools.

3. In a machine for making buttons from slabs of vegetable ivory having approximately parallel faces, a grip-carrier consisting of a pair of jaws provided with suitable apertures to give access to the operating-tools and means for opening and closing the said jaws consisting of a pinion mounted upon a screw adapted to engage with a threaded aperture in the fixed jaw and actuating a fork rigidly secured to the movable jaw, in combination with a segmental gear whereby the pinion may be rotated.

4. In a machine for making buttons from slabs of irregular outline and having approximately parallel faces, a multiple grip-carrier consisting of a series of grips adapted laterally to hold the slabs and mounted at uniform intervals upon a moving head, each grip consisting of a pair of jaws one of which is connected with a pinion, in combination with means for moving the head and with a hand-moved segment for closing the jaws, and with a fixed segment for automatically opening the same.

5. In a machine for manufacturing buttons from slabs of vegetable ivory of irregular outline and approximately parallel faces, a grip-carrier for laterally holding the slabs and adapted to give access to the operating-tools, and means for moving the said carrier intermittently, in combination with a series of facing-tools, consisting of a rough-shaping cutting-tool, a fine-finishing tool, and a drilling and countersinking tool mounted on one side of said carrier, and a series of backing-tools, consisting of a rough-shaping cutting-tool, a drilling and countersinking tool and a fine-finishing and cutting-out tool, mounted on the other side thereof, and means for intermittently reciprocating the said tools.

6. In a machine of the class described, a multiple grip-carrier adapted to laterally hold a series of slabs, and means for intermittently actuating the same, in combination with a series of facing-tools mounted on a carriage on one side of said carrier and a series of backing-tools mounted on a carriage on the other side thereof, and means for simultaneously bringing the tools in operation against opposite sides of the slabs held in said carrier, so that the tool on one side of the slab serves as a support for that slab as against the pressure of the tool on the opposite side thereof.

7. In a machine of the class described, the combination with a multiple grip-carrier adapted to laterally hold a series of slabs to be operated upon at uniform intervals by cutting and drilling tools mounted in series upon two reciprocating carriages one on each side of the carrier, of means for intermittently moving the carrier, and intermittently moving the tool-carriages whereby tools are brought to operate upon both sides of the same slab simultaneously and upon each slab in the series successively.

8. In a machine for manufacturing buttons from slabs of vegetable ivory having approximately parallel faces, a grip-carrier for laterally holding the slabs during said manufacture which consists of a pair of jaws each having a suitable aperture to give access to the operating-tools, one of said jaws being moved in relation to the other by means of a fork actuated by a pinion mounted upon a screw adapted to engage with a threaded aperture in the fixed jaw.

9. A machine for producing a completed button from a slab comprising a moving carrier provided with grips and a series of tools for rough cutting and finishing the front and back of the button, the said tools being placed in pairs opposite each other, the component members of each pair rotating in opposite directions and each of the sets of tools upon one side of the carrier being carried upon the same carriage so that the slabs will be operated upon both sides simultaneously with the minimum amount of strain.

10. In a machine of the class described, the combination of a grip-carrier consisting of two jaws adapted to hold a slab of material during the operation of suitable tools thereon, and means for closing said jaws, with means for automatically opening said jaws and discharging the waste material therefrom brought into action through the waste material itself.

11. The combination in one mechanism of a series of facing-tools, consisting of a rough-shaping tool, a fine-finishing tool and a drilling and countersinking tool, mounted on a carriage; a series of backing-tools, consisting of a rough-shaping tool, a drilling and countersinking tool and a finishing and cutting-out tool, mounted on a carriage; means for actuating the tools and moving the carriages and the tools to and from an intermittently-moving carrier centrally placed between the two series, whereby slabs of material, held in the said carrier, are successively operated upon first, simultaneously by the two rough-shaping tools, second, simultaneously by the fine-finishing facing-tool and the drilling and countersinking backing-tool, third, by the drilling and countersinking facing-tool, and fourth, by the finishing and cutting-out backing-tool.

12. The combination in one mechanism of a series of facing-tools, consisting of a rough-shaping tool, a fine-finishing tool and a drilling and countersinking tool, mounted on a carriage, a series of backing-tools, consisting of a rough-shaping tool, a drilling and countersinking tool and a finishing and cutting-out tool mounted on a carriage, means for actuating the tools and moving the carriages and the tools to and from an intermittently-moving carrier centrally placed between the two series, whereby slabs of material, held in the said carrier are successively operated upon first simultaneously by the two rough-shaping tools, second, simultaneously by the fine-finishing facing-tool and the drilling and countersinking backing-tool, third by the drilling and countersinking facing-tool, and fourth, by the finishing and cutting-out backing-tool, and means for simultaneously performing said operations upon successive slabs held by the carrier.

13. In a machine of the class described, the combination with an intermittently-actuated carrier adapted to hold a series of material slabs, of a series of facing-tools R, T, and U mounted on a carriage on one side of the carrier, and a series of backing-tools, Q S and V mounted on a carriage on the other side of said carrier and means for actuating and reciprocating the said carriages and tools whereby each slab in succession is operated upon, first, simultaneously at its face by the tool U and at its back by the tool Q; secondly, simultaneously at its face by the tool T and at its back by the tool S; thirdly, at its face by the tool R, and fourthly, at its back by the tool V.

14. The combination with the main frame, of the series of facing-tools U, T, R, and the series of backing-tools Q, S, V, and means for reciprocating and actuating them, the intermittently-moving rotary carrier provided with pinion-actuated jaws, a segmental gear adapted to mesh with the jaw-pinions, and a locking-pin intermittently moved at right angles to the plane of rotation of the carrier and engaging in suitable apertures therein.

15. The combination with the main frame, of the series of facing-tools U, T, R, and the series of backing-tools Q, S, V, and means for reciprocating and actuating them, the intermittently-moving rotary carrier provided with pinion-actuated jaws, and a segmental gear adapted to mesh with the jaw-pinions.

16. In a machine of the class described, a gang of parallel spindles, and means for actuating the same, each spindle being provided at its forward end with a recess in which is pivotally mounted the rear of a drill, the axis of which is at an angle to and not parallel with the axis of the spindle, a universal joint being formed by said pivot between the spindle and the drill.

17. In a machine of the class described, the combination of a gang of parallel spindles adapted simultaneously to drill all of the buttonholes in each piece of material and means for rotating the same, of means for adjusting their longitudinal position consisting of independent bars abutting against the rear ends of the spindles and mounted in suitable bearings, and having their axes coincident with the axes of the spindles, and means for moving the bars and rigidly holding them in position after adjustment.

18. In a machine of the class described, the combination with a gang of parallel spindles each carrying a pivotally-mounted drill at its forward end, and means for rotating the spindles, of independent means for longitudinally adjusting the position of each spindle, in combination with a disk suitably mounted in front of the spindles and provided with tapered apertures for the passage of the drills.

In testimony whereof I have signed this specification in the presence of two subscribing witnesses.

JOHN HORMBY.

Witnesses:
 B. M. SCOTT,
 CHESTER H. HIGGINS.